US006555776B2

(12) United States Patent
Roth et al.

(10) Patent No.: US 6,555,776 B2
(45) Date of Patent: Apr. 29, 2003

(54) SINGLE FEED ONE PASS MIXED MAIL SEQUENCER

(75) Inventors: J. Edward Roth, Lansdale, PA (US); William D. Bundschuh, Lansdale, PA (US)

(73) Assignee: Lockheed Martin Corporation, Bethesda, MD (US)

(*) Notice: Subject to any disclaimer, the term of this patent is extended or adjusted under 35 U.S.C. 154(b) by 80 days.

(21) Appl. No.: 09/822,215

(22) Filed: Apr. 2, 2001

(65) Prior Publication Data

US 2002/0139726 A1 Oct. 3, 2002

(51) Int. Cl.[7] ............................ B07C 5/00; B65G 47/30

(52) U.S. Cl. ........................ 209/584; 209/656; 209/900; 198/418.4

(58) Field of Search ................................. 209/552, 576, 209/577, 584, 656, 657, 900; 198/418.1, 418.4

(56) References Cited

U.S. PATENT DOCUMENTS

| | | | | |
|---|---|---|---|---|
| 3,548,995 A | | 12/1970 | Oderman et al. | |
| 4,150,743 A | | 4/1979 | Lazzarotti et al. | |
| 4,507,739 A | * | 3/1985 | Haruki et al. | 209/584 X |
| 5,042,793 A | | 8/1991 | Miyake | |
| 5,135,352 A | | 8/1992 | Scata et al. | |
| 5,638,938 A | | 6/1997 | Lazzarotti et al. | |
| 5,740,901 A | | 4/1998 | Lazzarotti et al. | |
| 5,803,704 A | | 9/1998 | Lazzarotti | |

FOREIGN PATENT DOCUMENTS

| | | | | |
|---|---|---|---|---|
| NL | 8403680 | * | 7/1986 | 209/584 |
| SU | 1623798 | * | 1/1991 | 209/584 |

* cited by examiner

*Primary Examiner*—Tuan N. Nguyen
(74) *Attorney, Agent, or Firm*—Schwartz & Weinrieb

(57) ABSTRACT

A letters/flats transporting, handling, and sorting system is disclosed for handling an initially random mixed input of letters and flats and for sorting the letters and flats into a delivery address sequence for delivery by postal service personnel as a result of only a single pass of the letters and flats through the system. Sequencing modules include loading trays and storage trays. The storage trays represent individual delivery address destinations and are arranged in delivery address sequence. Incoming letter and flat mail is deposited within the loading trays and the loading trays are individually actuated so as to transfer the letter and flat mail pieces into the proper delivery address storage trays whereupon the completion of the processing of an entire batch of incoming mail, all mail will be sorted in delivery address sequence within the storage trays which may then be emptied for ultimate delivery in their address sequence by the postal service personnel.

23 Claims, 4 Drawing Sheets

SINGLE FEED ONE PASS MIXED MAIL SEQUENCER

FIELD OF THE INVENTION

The present invention relates generally to postal mail conveying or transporting systems, and more particularly to a new and improved postal mail transporting, handling, and sorting system wherein originally random pieces of mail can be conveyed, sorted, and placed into a desirable delivery-walk or serial address sequence as a result of being conveyed or processed by means of only a single pass through the system.

BACKGROUND OF THE INVENTION

In connection with conventional mail delivery systems, two types of mail units generally comprise the vast majority of mail pieces or articles to be delivered, namely, letter mail, and what is known in the industry as flat mail or flats, which, more particularly, comprise, for example, magazines, newspapers, large envelopes, and the like. In order to optimally control, or even more desirably, reduce, operational or systemic costs, world-class postal services require, and are therefore seeking, a low-cost, high-throughput, automated system for sorting their daily mail, which is to be delivered, in accordance with what is known as a delivery-walk sequence format, or more simply, in accordance with a delivery-sequence format. In accordance with the general or overall concept of such a sequence format system, all destination-addressed mail pieces, originally disposed in a random manner at a particular postal collection, accumulation or repository location or facility, and which, taken as a whole, therefore inherently comprise, define, or have, in effect, a random array of delivery addresses printed thereon, would be processed and sorted in accordance with a desirable order or sequence. More particularly, in accordance with such a desirable sequence or order, all original, randomly-arranged destination-addressed mail pieces would be sorted or arranged in a particular or specific predetermined order which would correspond with the order of destination addresses to which the postal mail carrier would make his or her mail deliveries along his or her delivery route on a daily basis.

Various letters and flats systems, somewhat similar to the aforenoted desirable system, have been developed in the past in an attempt to attain the desired systemic objectives, however, for various reasons, such conventional systems have not been completely satisfactory or viable, and therefore, such systems have not been commercially successful. For example, the United States Postal Service (USPS) has developed several different systems, such as, for example, a Carrier Sequence Bar Code Sorter (CSBCS) System, or a Delivery Bar Code Sorter (DBCS) System, however, such systems are only capable of sorting and processing letter mail. While substantially one hundred percent (100%) of letter mail is currently provided with, for example, address bar codes in order to facilitate the implementation and operation of an automatic delivery sequence sorting system, currently, substantially all flat mail must still be manually sorted for integrated inclusion within a delivery sequence system. Obviously, additional economic benefits would be derived or achieved if an automatic delivery sequence sorting system was capable of implementing the processing or sorting of both letter mail and flat mail pieces, articles, units, or the like from an original random letter/flat mixed mail input.

Continuing further, an additional operational impediment of current automatic delivery sequence sorting systems with respect to their widespread usage and acceptance for sorting and processing various mail pieces, articles, units, or the like, resides in the fact that in order to ultimately arrange the original randomly-arranged destination-addressed mail pieces into the specifically desired delivery or serial address sequence or order, such conventional systems require that the randomly arranged destination-addressed mail pieces be conveyed through, or processed within, the systems a multiple number of times, that is, in accordance with terminology well-known in the art, the mail pieces must navigate multiple passes through the system. As a result of undergoing multiple-pass conveyance through the system, the mail pieces are pre-sorted into relatively large groups of mail pieces, the large groups of pre-sorted mail pieces are again subsequently sorted and processed through the system so as to further sort such mail pieces into relatively smaller groups, and the overall process is continued until predeterminedly sized manageable groups of mail are able to be effectively integrated into delivery-sequence collections or arrangements of the mail pieces to be delivered. It can therefore be appreciated that not only do such systems require a substantial period of time to fully sort and process a predetermined number of mail pieces, but in addition, the multi-pass conveyance or handling of the mail pieces through the system unfortunately provides additional opportunities for handling or sorting errors. Still yet further, and particularly in connection with the processing or sorting of flat mail pieces, flat mail pieces or articles are easily physically degraded when they are extensively handled. Consequently, the multiple passes of such flat mail pieces through conventional automated systems leads to the physical deterioration of flat mail articles which, again, renders such systems incapable of viably handling, sorting, and processing flat mail articles.

A need therefore exists in the art for a new and improved automatic postal mail transporting, handling, and sorting system which can viably handle both letter mail and flat mail, and wherein further, originally random pieces of both types of mail, presented or delivered into the system in a random letter/flat mixed input, can be conveyed, sorted, and placed into a desirable delivery-walk or serial address sequence as a result of being conveyed or processed by means of only a single pass through the system. In this manner, flat mail pieces will not be unduly degraded, and opportunities for mishandling of the mail pieces are limited.

OBJECTS OF THE INVENTION

Accordingly, it is an object of the present invention to provide a new and improved automatic postal mail transporting, handling, and sorting system which can viably handle both letter mail and flat mail.

Another object of the present invention is to provide a new and improved automatic postal mail transporting, handling, and sorting system which can viably handle both letter mail and flat mail and which effectively overcomes the various operational disadvantages and drawbacks characteristic of conventional PRIOR ART mail handling and sorting systems.

An additional object of the present invention is to provide a new and improved automatic postal mail transporting, handling, and sorting system wherein the system can viably handle both letter mail and flat mail, wherein the system can effectively overcome the various operational disadvantages and drawbacks characteristic of conventional PRIOR ART mail handling and sorting systems, and wherein originally random pieces of both types of mail, presented or delivered into the system in a random letter/flat mixed input, can be conveyed, sorted, and placed into a desirable delivery-walk or serial address sequence.

A further object of the present invention is to provide a new and improved automatic postal mail transporting, handling, and sorting system wherein the system can viably handle both letter mail and flat mail, wherein the system can effectively overcome the various operational disadvantages and drawbacks characteristic of conventional PRIOR ART mail handling and sorting systems, and wherein originally random pieces of both types of mail, presented or delivered into the system in a random letter/flat mixed input, can be conveyed, sorted, and placed into a desirable delivery-walk or serial address sequence as a result of being conveyed or processed by means of only a single pass through the system.

SUMMARY OF THE INVENTION

The foregoing and other objectives are achieved in accordance with the teachings and principles of the present invention through the provision of a new and improved automatic postal mail transporting, handling, and sorting system which comprises an upstream letters/flats mixed input feeder, and a bar code reader/optical character reader (BCR/OCR) disposed immediately downstream from the letters/flats mixed input feeder. The bar code reader/optical character reader thus receives a mixed input of letters and flats from the upstream letters/flats mixed input feeder and reads the bar code or optical character information disposed upon the letters and flats, it being appreciated that such read information corresponds, for example, to the particular delivery addresses to which the letters and flats are to be respectively delivered. This read information is then automatically entered into the memory of the central processing unit (CPU) or other similar computer-control system which has been integrated into the overall automatic mail handling and sorting system, and in this manner, further conveyance and sorting of each individual piece of letter mail and flat mail is able to be precisely controlled so as to thereby determine, in turn, precisely where each letter and flat is in fact to be routed so as to facilitate the correct delivery of the letters and flats to their ultimate delivery addresses.

More particularly, downstream from the bar code reader/optical character reader, the letters and flats are transported or conveyed to a letters/flats transporter/sorter conveyor section which comprises a plurality of letters/flats sequencing modules within which the letters and flats are actually sorted into the delivery sequence format. Each sequencing module comprises a loading mechanism and a storage mechanism, and a sorting gate, formed within the letters/flats transporter/sorter conveyor, is operatively associated with each sequencing module so as to effectively divert a particular letter or flat piece of mail from the transporter/sorter conveyor into a particular sequencing module when the particular sorting gate is opened or moved to its diverter mode or position by means of the computer control system. The storage mechanism comprises a plurality of vertically spaced storage trays which are mounted upon a flexible drive conveyor and which sequentially correspond to the delivery address destinations, within a defined delivery area or region, such as, for example, a particular street, road, avenue, or the like, to which the letter and flat mail pieces are to be delivered by means of the postal carrier. The loading mechanism similarly comprises a plurality of vertically spaced loading trays which are also mounted upon a flexible drive conveyor and which are adapted to receive a single letter or flat piece of mail from the transporter/sorter conveyor as a result of the particular sequencing module gate diverting a particular letter or flat piece of mail from the transporter/sorter conveyor into the particular sequencing module. During a complete mail transporting, handling, and sorting operation or cycle, the storage conveyor is maintained stationary so as to receive individual letters or flats from the loading mechanism conveyor, whereas the loading mechanism conveyor is incrementally moved so as to receive individual letters and flats from the transporter/sorter conveyor and to deliver each received individual letter or flat to a designated one of the storage trays disposed upon the storage mechanism conveyor.

Accordingly, at the conclusion of an entire mail transporting, handling, and sorting operation or cycle, all of the letters and flats are deposited within the correct storage trays of the storage mechanism conveyor. It is to be remembered that the storage trays of the storage mechanism conveyor are disposed in delivery address sequence and therefore, in effect, all of the letters and flats have now been automatically sorted and deposited upon the storage mechanism conveyor in delivery address sequence. Accordingly, at the conclusion of the entire mail transporting, handling, and sorting operation or cycle, the storage mechanism conveyor may be actuated so as to discharge all letters and flats from each storage tray of the storage mechanism conveyor in a serial manner into, for example, a sequenced mail tub or storage container which is then conveyed downstream for use by the postal carrier in delivering the delivery address sequenced mail to the proper delivery address destinations.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
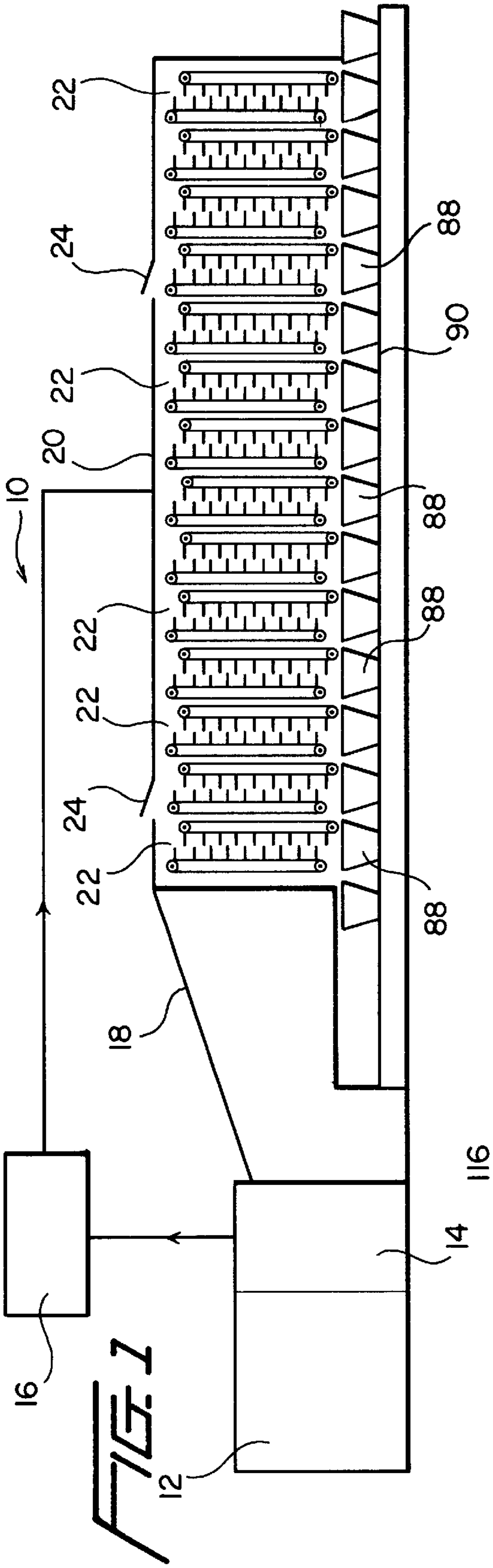
FIG. 1 is a schematic diagram illustrating the overall layout of a first fully automatic letter/flat mail handling, transporting, and sorting system constructed in accordance with the principles and teachings of the present invention for sorting in one pass an initially random mix of letters and flats into a delivery address sequence for delivery sequence by a postal mail carrier.

Referring now to the drawings, and more particularly to FIG. 1 thereof, a first fully automatic letter/flat mail handling, transporting, and sorting system, constructed in accordance with the principles and teachings of the present invention for sorting an initially random mix of letters and flats into a delivery address sequence for sequence delivery by a postal mail carrier, is illustrated and is designated by the reference character 10. Briefly, and from an overall point of view, mail pieces coming into the system 10 so as to be processed in accordance with the operation of the system 10, as developed in accordance with the principles and teachings of the present invention, will be flowing or conveyed from left to right. More particularly, as can be seen from FIG. 1, the incoming mail, which comprises a random mix of letters and flats, is initially input into a letters/flats feeder 12 by means of which the random mix of letters and flats is initially conveyed into a bar code reader/optical character reader (BCR/OCR) 14. The bar code reader/optical character reader 14 is provided so as to read either the address bar code which is present upon, for example, substantially all of the letter mail pieces or articles, or alternatively, to optically character read address information which was originally printed or handwritten upon, for example, flat mail pieces or articles by means of the addressor or sender. In either case, the address bar code and optically character read address information, which has been read by means of the bar code reader/optical character reader 14, comprises delivery address information concerning the delivery address to which the particular letter or flat mail article or piece is in fact to be delivered. This information is, in turn, input into a central processing unit (CPU) or other similar computer control system 16, wherein central processing unit or similar computer control system 16 is now able to track every piece of letter mail and flat mail in the order in which the plurality of letters and flats have serially or sequentially passed through the bar code reader/optical character reader 14. Accordingly, after passing through the bar code reader/optical character reader 14, the plurality of letters and flats, which are obviously still in a random mix or random order as far as their delivery addresses are concerned, are conveyed further downstream by means of an upwardly inclined conveyor 18 so as to be conveyed onto a transporter/sorter conveyor 20.

The transporter/sorter conveyor 20 comprises a horizontally disposed conveyor which is disposed above a plurality of vertically oriented sequencing modules 22, the components of which are shown in more detail within FIGS. 2–6, and it is seen that the transporter/sorter conveyor 20 is provided with a plurality of diverter gates 24, only two of which are illustrated for clarity purposes. In reality, one diverter gate 24 is provided for each sequencing module 22 so as to divert particularly conveyed letter and flat mail pieces into a particular sequencing module 22. It is to be appreciated that the diverter gates 24 are suitably or timely controlled by means of commands issued from the central processing unit or similar computer control system 16 in accordance with the delivery address information which appeared upon the particular letter and flat mail piece and which was of course previously read by means of the bar code reader/optical character reader 14 and transmitted therefrom to the central processing unit or control system 16. It is to be further appreciated that the sequencing modules 22 comprise storage compartments, as will be discussed shortly hereafter, which correspond to destination delivery addresses to which the particular letter and flat mail pieces are to be delivered, and that the destination delivery address data or information which is represented by each individual storage compartment of each sequencing module 22 is also present within the central processing unit or control system 16 whereby the address information read from the input mail pieces can be correlated by the processing unit or control system 16 with the address information represented by each storage compartment. Accordingly, as a result of the actuation of a particular diverter gate 24 operatively associated with a particular sequencing module 22, the particular letter or flat mail piece or article has undergone, in effect, a first step along its flow path toward being properly sorted and arranged in the ultimate delivery address sequence whereby the postal service carrier is then enabled or empowered to deliver all of their mail pieces in sequenced order to the various delivery addresses present upon their daily delivery route.

Figure 2:
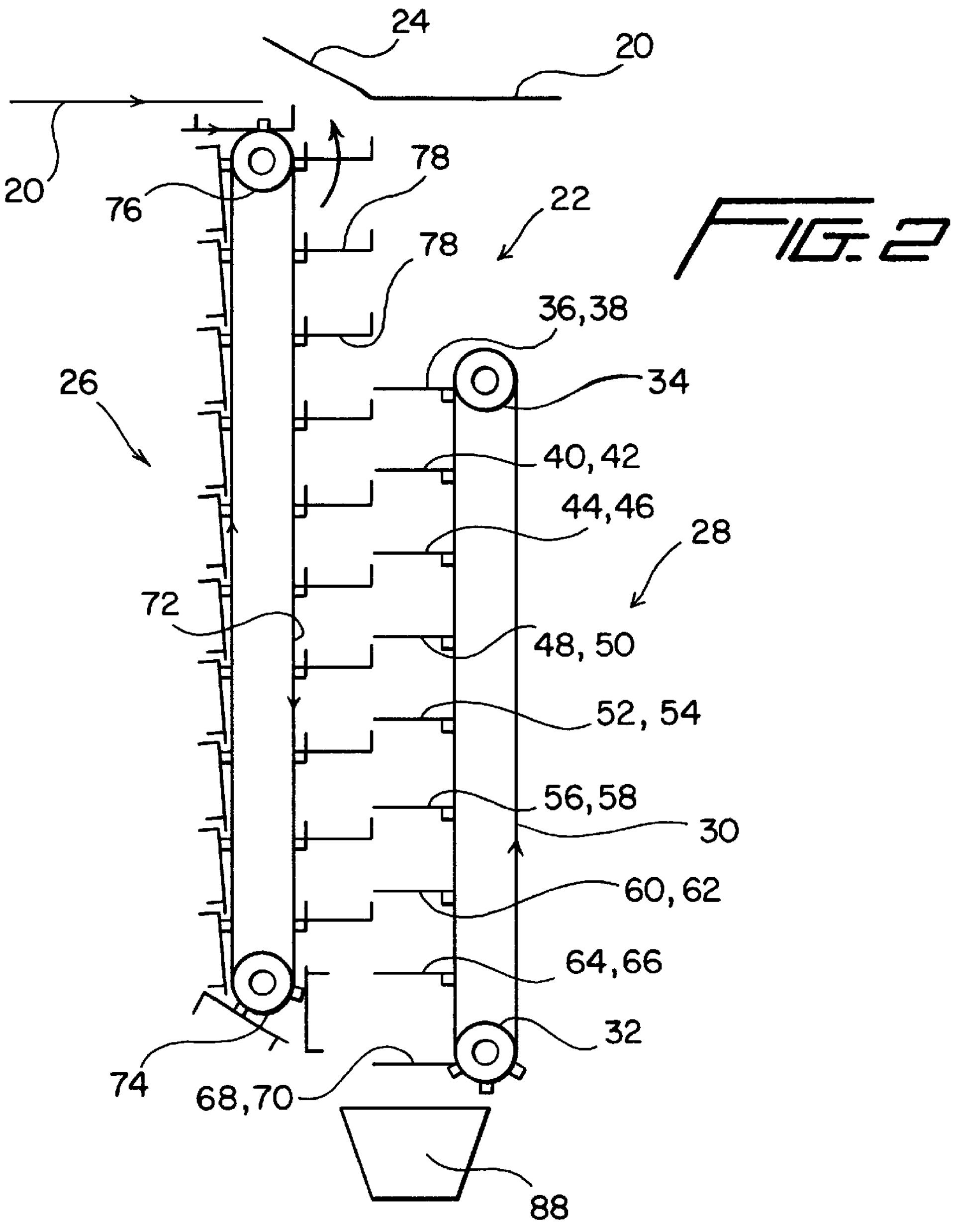
FIG. 2 is an enlarged side elevational detail view of one of the plurality of sequencing modules used within the handling, transporting, and sorting system of FIG. 1 wherein the sequencing module comprises a loading mechanism and a storage mechanism.

Continuing further, and with particular reference now being made to FIG. 2, the structure of one of the plurality of sequencing modules 22 utilized within the system 10 is disclosed in detail, it being of course noted that the structure of all of the sequencing modules 22 is precisely the same. More particularly, each sequencing module 22 is seen to comprise a vertically oriented loading mechanism 26 and a vertically oriented storage mechanism 28. The vertically oriented storage mechanism 28 is seen to comprise a vertically oriented flexible drive chain conveyor 30 which is routed around, for example, a lower drive pulley 32 and an upper idler pulley 34, the flexible drive chain conveyor 30 being driven or movable in the counterclockwise direction such that the left side vertical run of the flexible drive chain conveyor 30 moves downwardly when the flexible drive chain conveyor 30 is driven, while the right side vertical run of the flexible drive chain conveyor 30 moves upwardly when the flexible drive chain conveyor 30 is driven. The flexible drive chain conveyor 30 is provided with a plurality of vertically spaced sets of storage trays 36–70, and it is noted that each one of the storage trays 36–70 may comprise, for example, a wire form structure.

Figure 6:
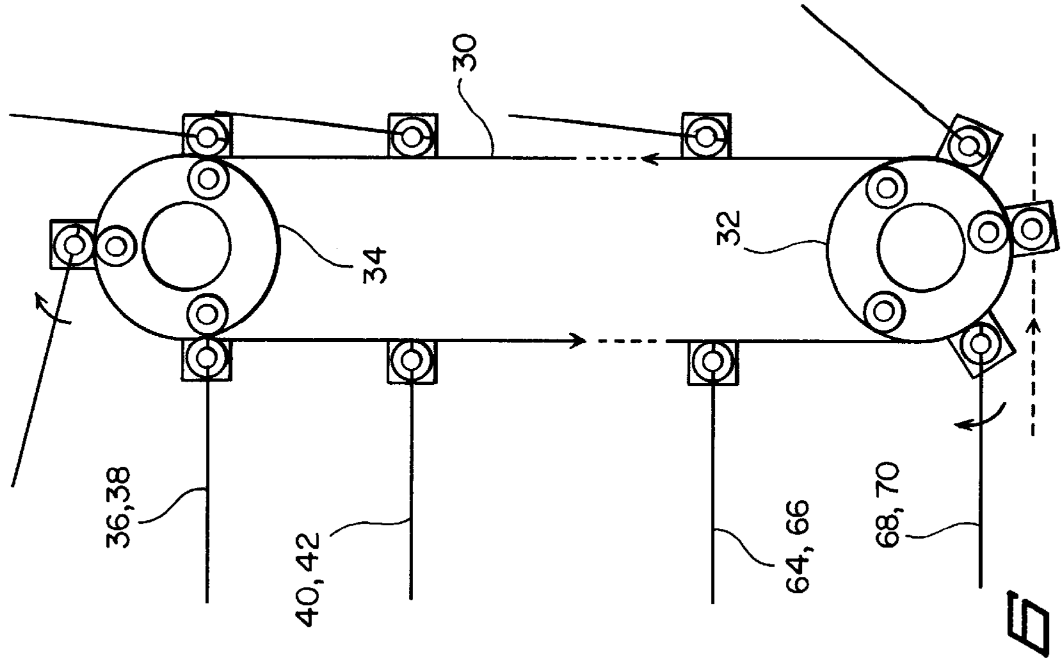
FIG. 6 is an enlarged side elevational detail view, similar to that of FIG. 3, showing however the storage mechanism of the sequencing module shown in FIG. 2.

It is additionally noted that while, in reality, storage trays, similar to storage trays 36–70, are spaced along the entire longitudinal extent of the flexible drive chain conveyor 30 such that sets of storage trays are also mounted upon the right side vertical run of the flexible drive chain conveyor 30 as illustrated in FIG. 6, FIG. 2 only discloses, in effect, the presence of storage trays 36–70 as being mounted upon the left side vertical run of the flexible drive chain conveyor 30 for clarity purposes in connection with the operation of the sequencing system 10, as will be discussed and explained more fully hereinafter. It is additionally noted that at each storage tray position or location defined along the longitudinal extent of the flexible drive chain conveyor 30, each set of storage trays comprises a pair of laterally spaced or laterally adjacent storage trays, so as to minimize or shorten the required vertical height or extent of the storage mechanism 28 and that of the sequencing modules 22, and still further, for the purposes of describing the operation of the sequencing system 10, this disclosure will be confined in effect to the storage trays 36–70 which are disposed only along the left side vertical run of the flexible drive chain conveyor 30.

More particularly, in accordance with the new and improved sequencing system 10 constructed in accordance with the principles and teachings of the present invention, each one of the storage trays of the vertically spaced sets of storage trays 36–70 represents a street address along a particular street, road, lane, or the like. For example, storage tray 36 may represent, for example, the street address of "36 Main Street", while storage tray 38 may likewise represent the street address "38 Main Street", with the last storage tray correspondingly representing the street address "70 Main Street". Accordingly, it is seen and appreciated that all of the storage trays 36–70 disposed upon this particular storage mechanism 28 of this particular sequencing module 22 are arranged in a sequential or serial manner, and that such storage trays 36–70 represent all of the street addresses, to which mail is to be delivered and which are correspondingly arranged in the same sequential or serial manner, upon a particular street, road, avenue or the like. It is of course to be additionally noted that the other sequencing modules 22 of the system 10 similarly represent street addresses of other streets, avenues, roads, and the like, and still further, it is also noted that a particular storage mechanism 28 of a particular sequencing module 22 can be tailored or modified, both in structure or actual use, in accordance with the required usage of the same in connection with, for example, the number of street addresses required to be serviced upon a particular street, road, avenue, or the like.

Figure 4:
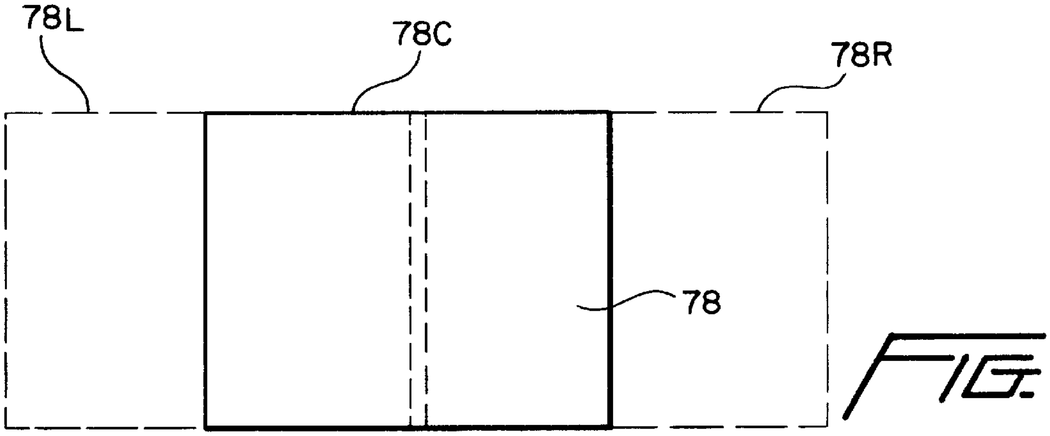
FIG. 4 is a top plan view of one of the loading tray components, of the loading mechanism shown in FIG. 3, wherein the loading tray component is shown by the solid line depiction as being in its central load position, and is shown by the dotted line depictions as being in either one of two unload positions.
Figure 3:
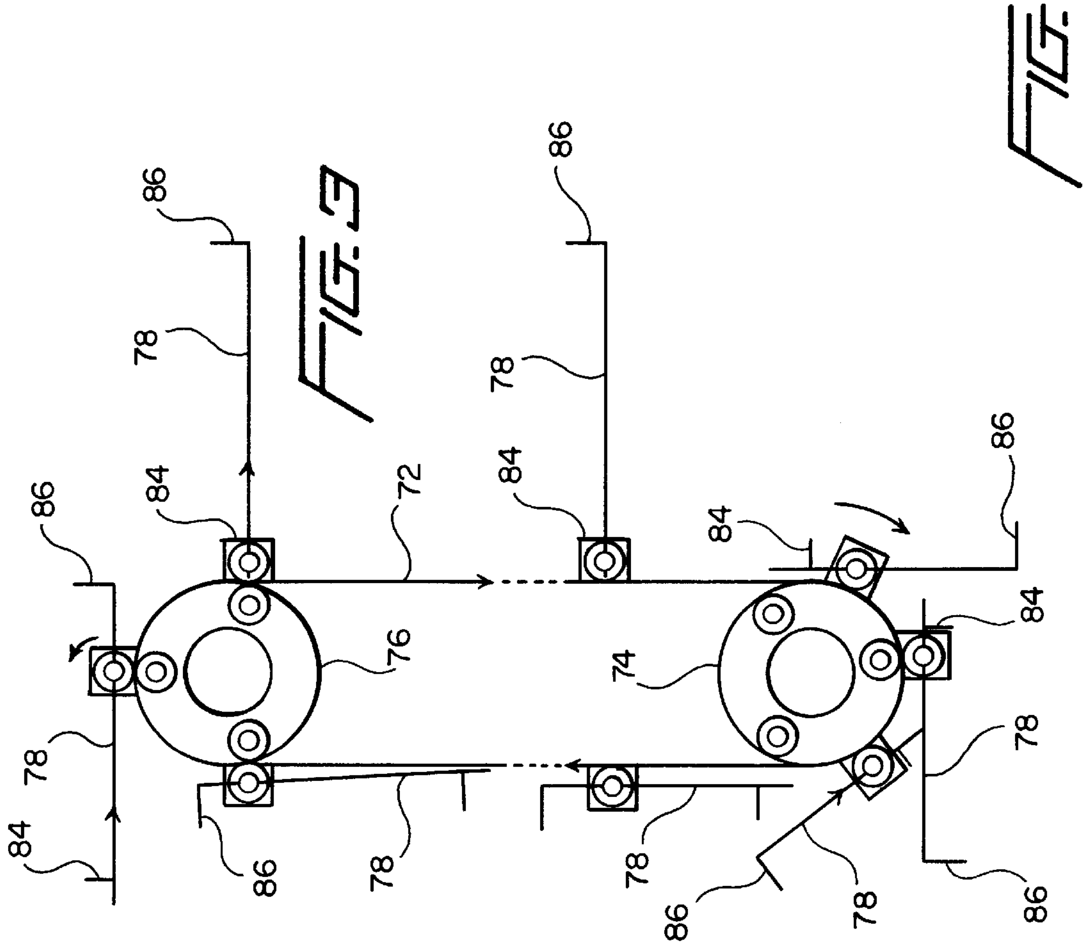
FIG. 3 is an enlarged side elevational detail view of the loading mechanism of the sequencing module shown in FIG. 2.

With reference now being additionally made to FIGS. 3 and 4, it is seen that the vertically oriented loading mechanism 26 is seen to comprise a vertically oriented flexible drive chain conveyor 72 which is routed around, for example, a lower drive pulley 74 and an upper drive pulley 76, the flexible drive chain conveyor 72 being driven or movable in the clockwise direction such that the left side vertical run of the flexible drive chain conveyor 72 moves upwardly when the flexible drive chain conveyor 72 is being driven, while the right side vertical run of the flexible drive chain conveyor 72 moves downwardly when the flexible drive chain conveyor 72 is being driven. The flexible drive chain conveyor 72 is provided with a plurality of vertically spaced loading trays 78, and it is noted that each one of the loading trays 78 may comprise, for example, a wire form structure. Each loading tray 78 is adapted to receive conveyed letter and flat mail pieces from the transporter/sorter conveyor 20, and is further adapted to discharge or unload the particular letter or flat mail piece onto a specific one of the storage trays 36–70 in order to properly dispose the particular letter or flat mail piece in its proper delivery address sequence as determined by means of the storage trays 36–70. In order to achieve such operations by each loading tray 78, and as may best be appreciated from FIG. 4, in addition to each loading tray 78 being capable of vertical movement as a result of its attachment to the vertically oriented flexible drive chain conveyor 72, each loading tray 78 is also capable of horizontal movement substantially within its own plane. More particularly, each loading tray 78 is laterally movable between a laterally central load position 78C, as shown by means of the solid lines in FIG. 4, at which the loading tray 78 receives a particular letter or mail piece from the transporter/sorter conveyor 20, and a pair of laterally offset left and right positions 78L,78R, as shown by means of the dotted lines in FIG. 4, at which the loading tray 78 positionally corresponds to the disposition or location of one of the storage trays comprising each set of laterally adjacent storage trays 36–70 such that the particular loading tray 78 can discharge or unload a particular letter or flat mail piece onto a particular one of the laterally adjacent storage trays comprising each set of storage trays 36–70. It is to be noted that the lateral offset movement to the left or right positions 78L, 78R of each loading tray 78 occurs immediately following the reception of a particular letter or mail piece into a particular loading tray 78 from the transporter/sorter conveyor 20 in preparation for its ultimate discharge or deposition into a particular one of the storage trays 36–70 when the particular loading tray 78 is subsequently moved to an elevational position corresponding to the location of the particular storage tray 36–70.

Figure 5A:
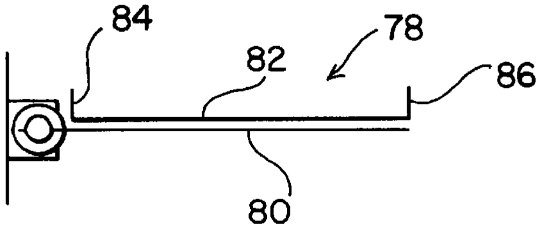
FIGS. 5*a*–5*g* are sequential schematic views of one of the loading tray components of the loading mechanism showing the loading tray component being actuated through a series of steps in connection with the discharge or unloading of a letter or flat piece of mail from the loading tray component onto a storage tray component of the storage mechanism shown in FIG. 2.

Still further, as may best be appreciated as a result of additional reference being made to, for example, FIG. 5*a*, the structure of each loading tray 78 is seen to comprise a base member 80 which is attached to the vertically oriented flexible drive chain conveyor 72, and a movable tray member 82 which is slidable upon the base member 80. The rear or trailing end portion of the slidable tray member 82 has an upstanding finger or pusher member 84 operatively associated therewith, and the forward or leading end portion of the slidable tray member 82 has a door or flap member 86 operatively associated therewith wherein the door or flap member 86 is pivotally movable between vertically upstanding and horizontally lowered positions. Accordingly, as may be further appreciated from FIGS. 5*b*–5*g*, when a particular letter or flat piece of mail, already loaded upon or present within a movable tray member 82 of a particular one of the loading trays 78 as a result of having been deposited therein by means of the transporter/sorter conveyor 20, is to be discharged or unloaded into a particular one of the storage trays 36–70, the particular loading tray 78, having also been previously moved to either one of its left or right unload positions 78L, 78R as seen in FIG. 4 so as to positionally correspond to the location of the particular one of the storage trays 36–70 into which the particular letter or flat piece of mail is to be deposited, is now moved to an elevational level which essentially corresponds to that of the particular one of the storage trays 36–70 into which the particular letter or flat piece of mail is to be deposited.

Figure 5B:
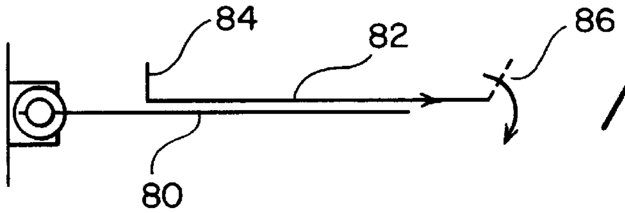
Figure 5C:
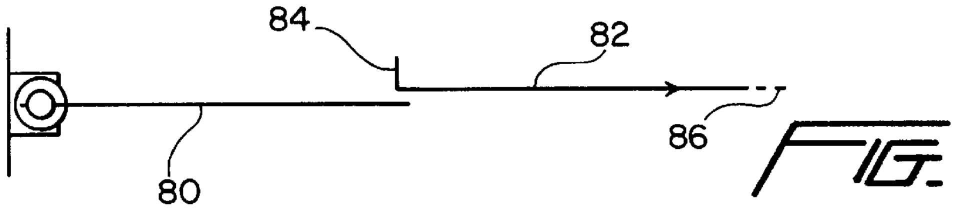
Figure 5D:
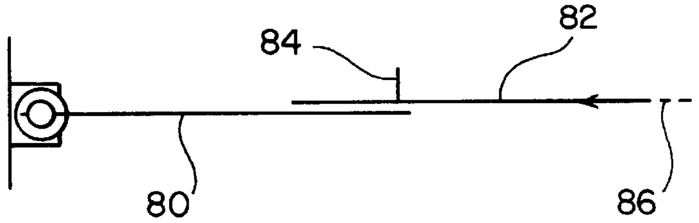
Figure 5E:
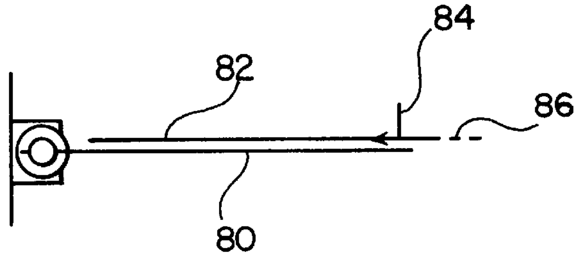
Figure 5F:
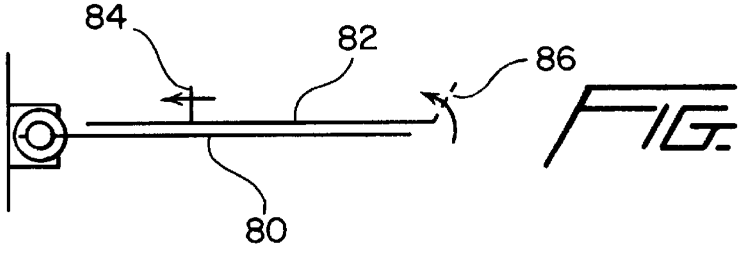
Figure 5G:
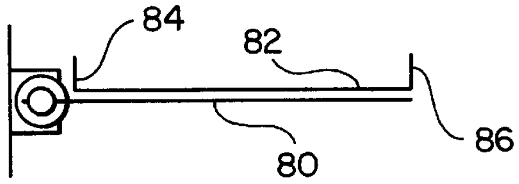

Subsequently, the slidable tray member 82 is moved to the right relative to the base member 80 as seen in FIG. 5*b*, and as the slidable tray member 82 continues to move toward the right, the leading edge door or flap member 86 is pivoted downwardly so as to now be disposed in its horizontal mode as shown in FIG. 5*c* whereby the particular letter or flat mail piece is able to be discharged or unloaded from the particular loading tray 78 and onto a particular one of the storage trays 36–70. The slidable tray member 82 is then retracted or moved backwardly towards its initial position as shown in FIG. 5*d*, and it will be appreciated that the structure of the loading tray assembly 78 is such that the slidable tray member 82 is also movable at this time with respect to or relative to the upstanding finger or pusher member 84. Accordingly, the upstanding finger or pusher member 84 serves to retain, in effect, the letter or flat piece of mail at its extended position with respect to the particular storage tray 36–70 such that when the slidable tray member 82 is substantially fully withdrawn or retracted back to its original position as illustrated in FIG. 5*e*, the particular letter or flat piece of mail will have been unloaded and discharged or deposited into a particular one of the storage trays 36–70. At this time, the upstanding finger or pusher member 84 is also retracted or moved backwardly toward its original disposition with respect to the slidable tray member 82, and the leading edge door or flap member 86 is again pivotally raised to its upstanding position as seen in FIG. 5*f* whereupon the loading tray assembly 78 is now disposed in its original position as seen in FIG. 5*g* which corresponds to its original mail receiving mode or position shown in FIG. 5*a*.

Having described essentially all of the detailed structure comprising the new and improved automatic letter/flat mail handling, transporting, and sorting system 10, which has been constructed in accordance with the principles and teachings of the present invention for sorting an initially random mix of letters and flats into a delivery address sequence for street delivery sequence by a postal mail carrier, the overall operation of the system 10 will now be described. Letter and flat pieces of mail, randomly mixed together both physically and with respect to their ultimate delivery address destinations, are conducted by means of the upwardly inclined conveyor 18 toward the transporter/sorter conveyor 20 after having passed through the bar code reader/optical character reader 14. It is to be remembered that as a result of having passed through the bar code reader/optical character read 14, delivery address information is obtained by the bar code reader/optical character reader 14 and transmitted to the central processing unit or computer control system 16 which is also operatively connected to the transporter/sorter conveyer 20, including all of the gate members 24 thereof, as well as to all of the sequencing modules 22.

Accordingly, as the plurality of letters and flats are serially conveyed by means of the upwardly inclined conveyor 18 and conveyed toward and onto the transporter/sorter conveyor 20, the processing unit or computer 16 is precisely aware of which particular letters and flats are being conveyed, including of course their destination delivery address information, as well as the serial order in which the particular letters and flats are being conveyed. Consequently, depending upon the particular destination delivery address information of particular letters or flats, the computer or processor 16 will control the actuation of a particular diverter gate 24 so as to cause a particular letter or flat to be diverted into a particular sequencing module 22 within which one of the storage trays 36–70 represents a street delivery address which corresponds to the street delivery address appearing upon the particularly diverted letter or flat.

Once the particular letter or flat is diverted by means of the particular diverter gate 24 into the particular one of the sequencing modules 22, it is deposited within the first or uppermost one of the loading trays 78. As additional letters and flats are introduced into the same sequencing module 22, the loading mechanism conveyor 72 is sequentially actuated so as to in effect be indexed incremental amounts whereby successive loading trays 78 are incrementally moved into the first or uppermost position so as to respectively receive the additional letters and flats whereby a single letter or flat is deposited within each one of the loading trays 78. As has been previously noted, immediately following the loading of a particular mail piece into a particular one of the loading trays 78, the particular loading tray 78 is firstly moved to one of its lateral unloading positions 78L or 78R corresponding to the particular one of the storage trays 36–70 into which the particular letter or flat mail piece is to be discharged. Consequently, the particular one of the loading trays 78, having disposed therein the particular letter or flat mail which of course has a delivery address thereon which corresponds to a particular one of the delivery addresses represented by a particular one of the storage trays 36–70, is then moved downwardly so as to be disposed at an elevational level which corresponds to that particular one of the storage trays 36–70 into which the letter and flat mail is to be discharged, and subsequently, the aforenoted structural components of that particular loading tray 78 are then actuated in accordance with the sequential operation as disclosed within FIGS. 5*a*–5*g*, and as previously described, whereby the particular letter or flat mail is unloaded from the particular loading tray 78 so as to be transferred to and deposited into the particular one of the storage trays 36–70. This process is then of course repeated until all of the mail pieces are transferred from the loading trays 78 into the properly designated delivery address storage trays 36–70 with all mail pieces for any particular one of the storage trays 36–70 being deposited within that particular storage tray. In other words, a particular one of the storage trays 36–70 contains only mail pieces which have addresses which correspond to the street delivery address represented by means of that particular storage tray. It is additionally noted that during the entire process wherein letter and flat mail is being deposited into the loading trays 78 and subsequently transferred from particular loading trays 78 into the particular storage trays 36–70, the vertically oriented flexible drive chain conveyor 30 is maintained stationary.

It is also noted that for those loading trays 78 which are disposed upon the left side vertical run of the loading mechanism conveyor 72 and which are not being employed to receive letter and flat mail pieces from the transporter/sorter conveyor 20, such loading trays 78 are in effect pivoted upwardly adjacent the left side vertical run of the loading mechanism conveyor 72, as seen in FIGS. 2 and 3, so as to conserve lateral space between adjacent sequencing modules 22 as may be appreciated from FIG. 1. Accordingly, it may be readily appreciated that regardless of the random mix or order in which all of the letters and flats were initially disposed or arranged, as a result of all of the letters and flats being respectively deposited or loaded into their respectively proper storage trays 36–70, all of the letters and flats are now automatically arranged in a delivery address sequence which corresponds to the delivery address sequence defined upon a particular route along which a postal carrier will deliver his or her daily mail. Still yet further, it is also noted that all of the mail has been processed and arranged in the aforenoted delivery address sequence as a result of only a single pass of all of the mail pieces through the system 10.

When a complete load or batch of letters and flats has been processed whereby all of the letters and flats are now disposed within their respectively proper or correct delivery address storage trays 36–70, the next step in the entire sequencing operation is to effectively unload the letters and flats from their respective storage trays 36–70. As seen in FIG. 1, each sequencing module 22, and more particularly, each storage mechanism 28 thereof, has a collection container or tub 88 disposed beneath the lower end portion of each storage mechanism 28 so as to actually be disposed beneath the left vertical side run of the vertically oriented flexible drive chain conveyor 30. Accordingly, when the storage trays 36–70 are to be unloaded into their respective containers or tubs 88, the flexible drive chain conveyor 30, which has up to this point in time been maintained stationary, is now actuated so as to incrementally index the lowermost set of storage trays 68, 70 to a discharge position as illustrated more clearly in FIG. 6 at which the set of storage trays 68, 70 is moved toward the right, as designated by the dotted lines, to a retracted position whereby the letters and flats disposed within the storage trays 68, 70 will fall downwardly into the collection tub or container 88.

While not shown in detail in FIG. 6, the actual structure of each storage tray may be somewhat similar to the structure of any one of the loading trays 78 as more particularly disclosed within FIGS. 5*a*–5*g* in that each one of the storage trays may be slidable, in a manner similar to that of slidable tray member 82, and may also preferably include an upstanding finger or pusher member, similar to pusher or finger member 84, so as to facilitate the discharge of the letter and flat mail from the respective storage trays 36–70. Upon retraction of the storage trays 68, 70 and the discharge of the letter and flat mail therefrom into the collection tub or container 88, the vertically oriented flexible drive chain conveyor 30 will again be incrementally actuated so as to now dispose the next set of storage trays 64, 66 at the lowermost discharge position whereupon retraction of the storage trays 64, 66 in the manner disclosed in FIG. 6, the letter and flat mail stored within the storage trays 64, 66 will now be disposed within the collection tub or container 88 so as to, for example, be disposed atop the letter and flat mail previously discharged from storage trays 68, 70. As can be readily appreciated, the entire mail unloading or discharge process is repeated until all of the storage trays 36–70 have been emptied whereby all of the letter and flat mail has been discharged into the collection tub or container 88. It can therefore be further appreciated that all of the letter and flat mail is now disposed within the collection tub or container 88 in a stacked, delivery address sequential or serial manner whereby the mail is readied for delivery by a postal service carrier in the required delivery route address sequence. As was the case with the loading trays 78, after the storage trays have been emptied and are now disposed upon the right side vertical run of the storage conveyor 30, the storage trays are pivoted upwardly adjacent to the right side vertical run of the storage conveyor 30, as seen in FIG. 6, so as to minimize adjacent spacing between the sequencing modules as can also be appreciated from FIG. 1. It is lastly noted that the plurality of collection containers or tubs 88 are disposed upon a tub or container transport conveyor 90 by means of which all of the collection containers or tubs 88 may be conveyed to a downstream location at which the collection tubs or containers 88 can be loaded, for example, upon postal service carrier trucks so that the postal carriers can in fact deliver the mail to the designated address destinations located along their delivery routes.

Figure 7:
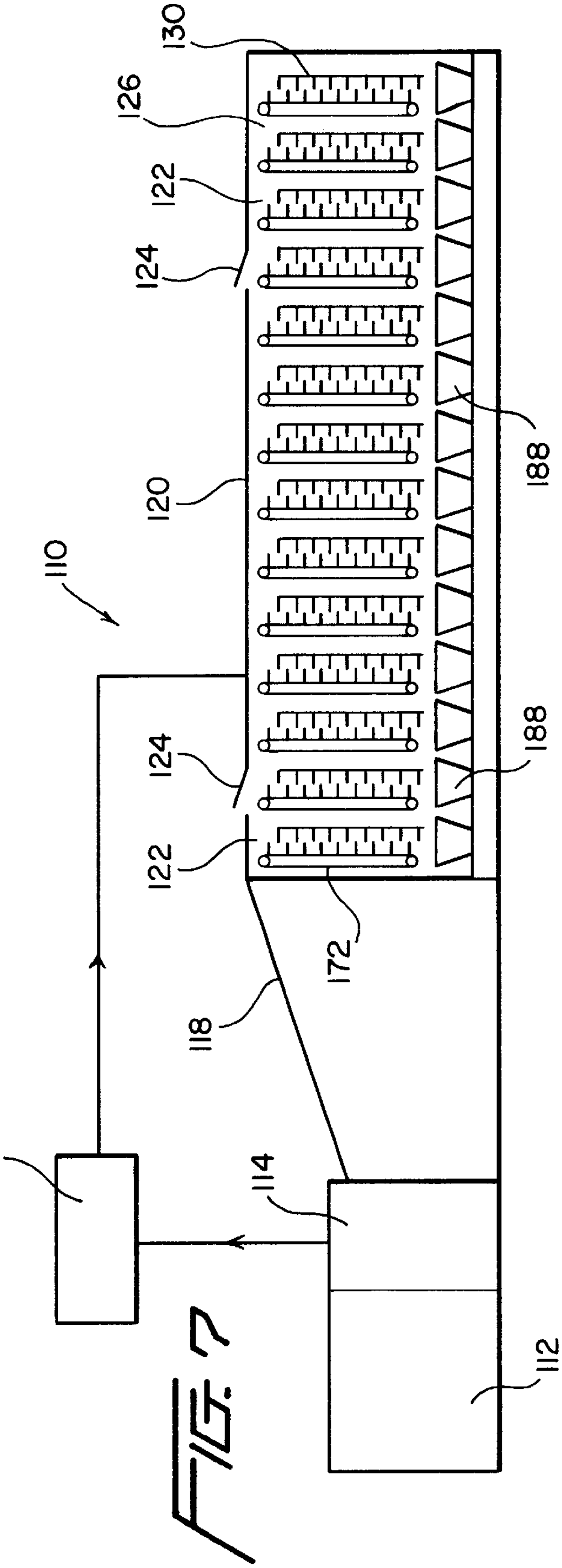
FIG. 7 is a schematic diagram, similar to that of FIG. 1, illustrating however the overall layout of a second semi-automatic letter/flat mail handling, transporting, and sorting system constructed in accordance with the principles and teachings of the present invention for likewise sorting in one pass an initially random mix of letters and flats into a delivery address sequence for delivery sequence by a postal mail carrier.

With reference lastly being made to FIG. 7, a second semi-automatic letter/flat mail handling, transporting, and sorting system, constructed in accordance with the principles and teachings of the present invention for sorting an initially random mix of letters and flats into a delivery address sequence for sequence delivery by a postal mail carrier, is illustrated and is designated by the reference character 110. It is noted that the semi-automatic letter/flat mail handling and sorting system 110 is substantially identical to the automatic letter/flat mail handling and sorting system 10 as disclosed, for example, within FIG. 1, except as will be noted hereinafter, and therefore, component parts of the semi-automatic handling and sorting system 110 which correspond to the component parts of the automatic handling and sorting system 10 will be designated by corresponding reference characters except that the reference characters will be within the 100 series. Therefore, it is further noted, in the interest of brevity, that in view of the substantially identical structure comprising both the automatic and semi-automatic letter/flat mail handling and sorting systems 10, 110, a detailed description of the semi-automatic letter/flat mail handling and sorting system 110 will not be provided, but the description of the same will only be directed to the major difference between the two systems 10, 110.

In particular, then, the only substantial difference between the two automatic and semi-automatic letter/mail handling and sorting systems 10, 110 resides in the fact that in accordance with the semi-automatic system 110 as disclosed within FIG. 7, it is seen that the vertically oriented flexible drive chain conveyor 30, having the pivotally movable storage trays 36–70 mounted thereon, has been eliminated, and in lieu thereof, a relatively fixed shelving system 130 is provided within each sequencing module 122 and in operative conjunction with each one of the vertically oriented flexible drive chain conveyor 172 of each loading mechanism 126. Within each shelving system 130, there is of course provided the sets of delivery address storage trays 136–170, and consequently, the system 110 is substantially operatively identical to the operation of the system 10. In view of the absence of the flexible drive chain conveyor 30, the system 110 cannot of course automatically empty the delivery address storage trays 136–170 into the collection tubs or containers 188, and therefore, each set of storage trays 136–170 is preferably provided with a slidable tray structure similar to the particular tray structure characteristic of the loading trays 78 as disclosed within FIGS. 5*a*–5*g* whereby personnel can manually move the slidable tray components outwardly in order to empty the sets of storage trays 136–170 when it is desired to empty the mail contents of such storage trays 136–170 into the collection tubs or containers 188. In addition to the elimination of the flexible drive chain conveyor 30, the collection tub or container transport conveyor 90 may likewise be eliminated whereby the collection tubs or containers 188 would have to be manually removed to the downstream distribution location. The semi-automatic handling and sorting system 110 is thus appreciated to be a somewhat less expensive version of the automatic handling and sorting system 10 and therefore provides economic advantages when compared to the fully automatic letter/flat mail handling and sorting system 10 as disclosed within FIG. 1.

Thus, it may be seen that in accordance with the teachings and principles of the present invention, there has been provided a mixed input letter/flat mail handling and sorting system which is able to handle and sort an initially random mix of letters and flats whereby the system can place all of the letters and flats into delivery address sequence, for address sequence delivery by a postal carrier, as a result of only a single pass of such letters and flats through the system.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A postal mail handling and sorting system, comprising:

input feed means for feeding a random mixed input of mail pieces having randomly arranged street addresses printed thereon;

a plurality of receiving compartments, respectively representing a plurality of delivery addresses arranged in a predetermined sequence which corresponds to sequenced delivery addresses upon a particular route to which mail is to be delivered in accordance with a delivery address sequence, for receiving said mail pieces in said delivery address sequence; and means for sorting said random mixed input of mail pieces such that said sorted mail pieces can be placed into said plurality of receiving compartments as a result of a single pass of said random mixed input of mail pieces through said system from said input feed means to said plurality of receiving compartments whereby mail pieces originally comprising said random mixed input of said mail pieces having said randomly arranged street addresses printed thereon are now disposed within said plurality of receiving compartments so as to be arranged in said delivery address sequence.

2. The system as set forth in claim 1, wherein:

said random mixed input of said mail pieces comprises a random mixed input of letter and flat mail pieces.

3. The system as set forth in claim 2, further comprising:

reader means for reading printed address information from said random mixed input letter and flat mail pieces;

conveyor means for conveying said random mixed input letter and flat mail pieces from said reader means toward said plurality of receiving compartments; and computer control means, into which is input said printed address information read by said reader means from said random mixed input letter and flat mail pieces, and within which said sequenced delivery addresses as respresented by said plurality of receiving compartments are also present, for controlling said sorting means in order to properly route said random mixed input letter and flat mail pieces toward said plurality of receiving compartments such that said letter and flat mail pieces are now properly arranged within said plurality of receiving compartments in accordance with said delivery address sequence.

4. The system as set forth in claim 3, further comprising:

a plurality of loading and transfer compartments, respectively operatively associated with said plurality of receiving compartments, for receiving said random mixed input letter and flat mail pieces from said conveyor means and for transferring said random mixed input letter and flat mail pieces to predetermined ones of said receiving compartments so as to properly arrange said letter and flat mail pieces within said plurality of receiving compartments in accordance with said delivery address sequence.

5. The system as set forth in claim 3, wherein:

said sorting means comprises diverter gates provided within said conveyor means and activated by said computer control means for diverting predetermined ones of said random mixed input letter and flat mail pieces toward predetermined ones of said plurality of receiving compartments.

6. The system as set forth in claim 4, wherein:

said sorting means comprises diverter gates provided within said conveyor means and activated by said computer control means for diverting predetermined ones of said random mixed input letter and flat mail pieces toward predetermined ones of said plurality of loading and transferring compartments.

7. The system as set forth in claim 4, wherein:

said plurality of loading and transferring compartments are disposed within a first vertical array; and said plurality of receiving compartments are disposed in a second vertical array disposed adjacent to said first vertical array of said plurality of loading and transferring compartments.

8. The system as set forth in claim 7, wherein:

said first vertical array of said loading and transferring compartments are mounted upon a first vertically oriented flexible drive chain conveyor; and said second vertical array of said receiving compartments are mounted upon a second vertically oriented flexible drive chain conveyor.

9. The system as set forth in claim 8, wherein:

said computer control means is operatively connected to said first vertically oriented flexible drive chain conveyor so as to incrementally move said plurality of loading and transferring compartments relative to said plurality of receiving compartments disposed upon said second vertically oriented flexible drive chain conveyor so as to properly place said sorted mail pieces into predetermined ones of said plurality of receiving compartments in accordance with said delivery address sequence.

10. The system as set forth in claim 7, wherein:

said first vertical array of said loading and transferring compartments are mounted upon a first vertically oriented flexible drive chain conveyor; and said second vertical array of said receiving compartments are mounted upon a second vertically oriented fixed shelving system.

11. The system as set forth in claim 9, further comprising:

a collection container disposed beneath said second vertical array of said receiving compartments mounted upon said second vertically oriented flexible drive chain conveyor; and said computer control means is operatively connected to said second vertically oriented flexible drive chain conveyor so as to incrementally move said plurality of receiving compartments upon completion of a sorting operation with respect to a predetermined batch of mail pieces so as to permit said sorted mail pieces to be discharged from said plurality of receiving compartments into said collection container so as to collect said sorted mail pieces within said collection container in accordance with said delivery address sequence.

12. The system as set forth in claim 7, wherein:

said first vertical array of said loading and transferring compartments are mounted upon a plurality of first vertically oriented flexible drive chain conveyors arranged within a horizontal array; and said second vertical array of said receiving compartments are mounted upon a plurality of second vertically oriented flexible drive chain conveyors arranged within said horizontal array.

13. The system as set forth in claim 12, further comprising:

a plurality of collection containers respectively disposed beneath each one of said second vertically oriented flexible drive chain conveyors upon which said second vertical arrays of said receiving compartments are mounted; and said computer control means is operatively connected to each one of said second vertically oriented flexible drive chain conveyors so as to incrementally move said plurality of receiving compartments upon completion of a sorting operation with respect to a predetermined batch of mail pieces so as to permit said sorted mail pieces to be discharged from said plurality of receiving compartments into respective ones of said collection containers so as to collect said sorted mail pieces within each one of said collection containers in accordance with said delivery address sequence.

14. The system as set forth in claim 7, wherein:

said plurality of receiving compartments disposed within said second vertical array comprises a pair of laterally adjacent receiving compartments disposed at each elevational level of said second vertical array; and said plurality of loading and transferring compartments disposed within said first vertical array each comprises a single compartment at each elevational level of said first vertical array which is movable between a central loading position at which each one of said loading and transferring compartments receives a piece of mail from said conveyor means, and a pair of laterally spaced unloading positions at which each one of said loading and transferring compartments can transfer a piece of mail to either one of said pair of laterally adjacent receiving compartments of said plurality of receiving compartments.

15. A letter and flat mail handling and sorting system, comprising:

input feed means for feeding a random mixed input of letter and flat mail pieces having randomly arranged street addresses printed thereon;

reader means for reading printed address information from said fed random mixed input of letter and flat mail pieces;

a plurality of receiving compartments, respectively representing a plurality of delivery addresses arranged in a predetermined sequence which corresponds to sequenced delivery addresses upon a particular route to which letter and flat mail is to be delivered in accordance with a delivery address sequence, for receiving said letter and flat mail pieces in said delivery address sequence;

conveyor means for conveying said random mixed input of letter and flat mail pieces from said reader means toward said plurality of receiving compartments;

a plurality of loading and transfer compartments, respectively operatively associated with said plurality of receiving compartments, for receiving said random mixed input letter and flat mail pieces from said conveyor means and for transferring said random mixed input letter and flat mail pieces to predetermined ones of said receiving compartments so as to properly arrange said letter and flat mail pieces within said plurality of receiving compartments in accordance with said delivery address sequence;

means operatively connected to said conveyor means for sorting said random mixed input of letter and flat mail pieces such that said sorted letter and flat mail pieces can be directed into said plurality of loading and transfer compartments, and in turn into said plurality of receiving compartments, as a result of a single pass of said random mixed input of letter and flat mail pieces through said system from said input feed means to said plurality of receiving compartments whereby letter and flat mail pieces originally comprising said random mixed input of said letter and flat mail pieces having said randomly arranged street addresses printed thereon are now disposed within said plurality of receiving compartments so as to be arranged in said delivery address sequence; and computer control means, into which is input said printed address information read by said reader means from said random mixed input letter and flat mail pieces, and within which said sequenced delivery addresses as respresented by said plurality of receiving compartments are also present, for controlling said sorting means and said plurality of loading and transfer compartments in order to properly route said random mixed input letter and flat mail pieces toward said plurality of receiving compartments such that said letter and flat mail pieces are now properly arranged within said plurality of receiving compartments in accordance with said delivery address sequence.

16. The system as set forth in claim 15, wherein:

said plurality of loading and transferring compartments are disposed within a first vertical array; and said plurality of receiving compartments are disposed within a second vertical array disposed adjacent to said first vertical array of said plurality of loading and transferring compartments.

17. The system as set forth in claim 16, wherein:

said first vertical array of said loading and transferring compartments are mounted upon a first vertically oriented flexible drive chain conveyor; and said second vertical array of said receiving compartments are mounted upon a second vertically oriented flexible drive chain conveyor.

18. The system as set forth in claim 17, wherein:

said computer control means is operatively connected to said first vertically oriented flexible drive chain conveyor so as to incrementally move said plurality of loading and transferring compartments relative to said plurality of receiving compartments disposed upon said second vertically oriented flexible drive chain conveyor so as to properly place said sorted letter and flat mail pieces into predetermined ones of said plurality of receiving compartments in accordance with said delivery address sequence.

19. The system as set forth in claim 16, wherein:

said first vertical array of said loading and transferring compartments are mounted upon a first vertically oriented flexible drive chain conveyor; and said second vertical array of said receiving compartments are mounted upon a second vertically oriented fixed shelving system.

20. The system as set forth in claim 18, further comprising:

a collection container disposed beneath said second vertical array of said receiving compartments mounted upon said second vertically oriented flexible drive chain conveyor; and said computer control means is operatively connected to said second vertically oriented flexible drive chain conveyor so as to incrementally move said plurality of receiving compartments upon completion of a sorting operation with respect to a predetermined batch of letter and flat mail pieces so as to permit said sorted letter and flat mail pieces to be discharged from said plurality of receiving compartments into said collection container so as to collect said sorted letter and flat mail pieces within said collection container in accordance with said delivery address sequence.

21. The system as set forth in claim 16, wherein:

said first vertical array of said loading and transferring compartments are mounted upon a plurality of first vertically oriented flexible drive chain conveyors arranged within a horizontal array; and said second vertical array of said receiving compartments are mounted upon a plurality of second vertically oriented flexible drive chain conveyors arranged within said horizontal array.

22. The system as set forth in claim 21, further comprising:

a plurality of collection containers respectively disposed beneath each one of said second vertically oriented flexible drive chain conveyors upon which said second vertical arrays of said receiving compartments are mounted; and said computer control means is operatively connected to each one of said second vertically oriented flexible drive chain conveyors so as to incrementally move said plurality of receiving compartments upon completion of a sorting operation with respect to a predetermined batch of letter and flat mail pieces so as to permit said sorted letter and flat mail pieces to be discharged from said plurality of receiving compartments into respective ones of said collection containers so as to collect said sorted letter and flat mail pieces within each one of said collection containers in accordance with said delivery address sequence.

23. The system as set forth in claim 16, wherein:

said plurality of receiving compartments disposed within said second vertical array comprises a pair of laterally adjacent receiving compartments disposed at each elevational level of said second vertical array; and said plurality of loading and transferring compartments disposed within said first vertical array each comprises a single compartment at each elevational level of said first vertical array which is movable between a central loading position at which each one of said loading and transferring compartments receives a piece of mail from said conveyor means, and a pair of laterally spaced unloading positions at which each one of said loading and transferring compartments can transfer a piece of mail to either one of said pair of laterally adjacent receiving compartments of said plurality of receiving compartments.

* * * * *

US006555776C1

(12) EX PARTE REEXAMINATION CERTIFICATE (7827th)

United States Patent

Roth et al.

(10) Number: US 6,555,776 C1

(45) Certificate Issued: Oct. 26, 2010

(54) SINGLE FEED ONE PASS MIXED MAIL SEQUENCER

(75) Inventors: J. Edward Roth, Lansdale, PA (US); William D. Bundschuh, Lansdale, PA (US)

(73) Assignee: Lockheed Martin Corporation, Bethesda, MD (US)

Reexamination Request:
No. 90/008,847, Sep. 12, 2007

Reexamination Certificate for:

| | |
|---|---|
| Patent No.: | **6,555,776** |
| Issued: | **Apr. 29, 2003** |
| Appl. No.: | **09/822,215** |
| Filed: | **Apr. 2, 2001** |

(51) Int. Cl.

| | |
|---|---|
| ***B07C 5/00*** | (2006.01) |
| ***B65G 47/30*** | (2006.01) |

(52) U.S. Cl. ........................ 209/584; 209/656; 209/900; 198/418.4

(58) Field of Classification Search ........................ None
See application file for complete search history.

(56) References Cited

U.S. PATENT DOCUMENTS

| | | | |
|---|---|---|---|
| 2,901,089 | A | 8/1959 | Rabinow et al. |
| 3,548,995 | A | 12/1970 | Oderman et al. |
| 4,150,743 | A | 4/1979 | Lazzarotti et al. |
| 4,507,739 | A | 3/1985 | Karuki et al. |
| 5,042,793 | A | 8/1991 | Miyake |
| 5,135,352 | A | 8/1992 | Scata et al. |
| 5,433,325 | A | 7/1995 | Levaro et al. |
| 5,638,938 | A | 6/1997 | Lazzarotti et al. |
| 5,740,901 | A | 4/1998 | Lazzarotti et al. |
| 5,803,704 | A | 9/1998 | Lazzarotti |
| 7,060,926 | B2 | 6/2006 | Edmonds |

FOREIGN PATENT DOCUMENTS

| | | |
|---|---|---|
| NL | 8403680 | 7/1986 |
| SU | 1623798 | 1/1991 |

OTHER PUBLICATIONS

Arthur D. Little, Inc., Technology Resource Center, "Carrier In–Office Study Single Pass System Concept: Development and Evaluation," Sep. 1986.

U.S. Appl. No. 60/255,400, filed Nov. 6, 2003, Edmonds.

U.S. Appl. No. 60/214,255, filed Nov. 6, 2003, Edmonds.

*Primary Examiner*—Catherine S. Williams

(57) ABSTRACT

A letters/flats transporting, handling, and sorting system is disclosed for handling an initially random mixed input of letters and flats and for sorting the letters and flats into a delivery address sequence for delivery by postal service personnel as a result of only a single pass of the letters and flats through the system. Sequencing modules include loading trays and storage trays. The storage trays represent individual delivery address destinations and are arranged in delivery address sequence. Incoming letter and flat mail is deposited within the loading trays and the loading trays are individually actuated so as to transfer the letter and flat mail pieces into the proper delivery address storage trays whereupon the completion of the processing of an entire batch of incoming mail, all mail will be sorted in delivery address sequence within the storage trays which may then be emptied for ultimate delivery in their address sequence by the postal service personnel.

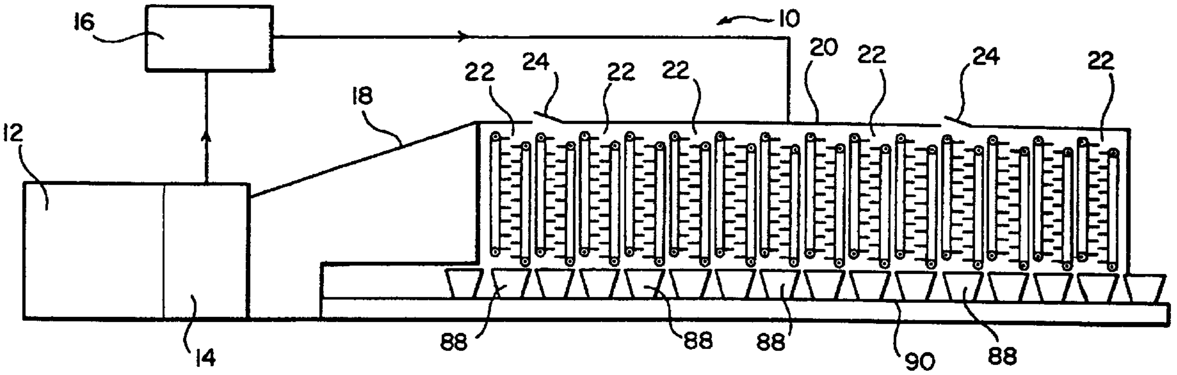

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 8, 12, 14 and 15-16 are determined to be patentable as amended.

Claims 2, 4-7, 9-11, 13 and 17-23, dependent on an amended claim, are determined to be patentable.

New claims 24-42 are added and determined to be patentable.

1. A postal mail handling and sorting system, comprising:

input feed means for feeding a random mixed input of mail pieces having randomly arranged street addresses printed thereon;

a plurality of *vertically moveable spaced apart* receiving compartments, respectively representing a plurality of delivery addresses arranged in a predetermined sequence which corresponds to sequenced delivery addresses upon a particular route to which mail is to be delivered in accordance with a delivery address sequence, for receiving said mail pieces in said delivery address sequence; and means for sorting said random mixed input of mail pieces such that said sorted mail pieces can be placed into said plurality of receiving compartments as a result of a single pass of said random mixed input of mail pieces through said system from said input feed means to said plurality of receiving compartments whereby mail pieces originally comprising said random mixed input of said mail pieces having said randomly arranged street addresses printed thereon are now disposed within said plurality of receiving compartments so as to be arranged in said delivery address sequence.

3. The system as set forth in claim 2, further comprising:

reader means for reading printed address information from said random mixed input letter and flat mail pieces;

conveyor means for conveying said random mixed input letter and flat mail pieces from said reader means toward said plurality of receiving compartments; and computer control means, into which is input said printed address information read by said reader means from said random mixed input letter and flat mail pieces, and within which said sequenced delivery addresses as [respresented] *represented* by said plurality of receiving compartments are also present, for controlling said sorting means in order to properly route said random mixed input letter and flat mail pieces toward said plurality of receiving compartments such that said letter and flat mail pieces are now properly arranged within said plurality of receiving compartments in accordance with said delivery address sequence.

8. [The system as set forth in claim 7, wherein:] *A postal mail handling and sorting system, comprising:*

*input feed means for feeding a random mixed input of mail pieces having randomly arranged street addresses printed thereon, said random mixed input of said mail pieces comprises a random mixed input of letter and flat mail pieces;*

*a plurality of receiving compartments, respectively representing a plurality of delivery addresses arranged in a predetermined sequence which corresponds to sequenced delivery addresses upon a particular route to which mail is to be delivered in accordance with a delivery address sequence, for receiving said mail pieces in said delivery address sequence;*

*means for sorting said random mixed input of mail pieces such that said sorted mail pieces can be placed into said plurality of receiving compartments as a result of a single pass of said random mixed input of mail pieces through said system from said input feed means to said plurality of receiving compartments whereby mail pieces originally comprising said random mixed input of said mail pieces having said randomly arranged street addresses printed thereon are now disposed within said plurality of receiving compartments so as to be arranged in said delivery address sequence;*

*reader means for reading printed address information from said random mixed input letter and flat mail pieces;*

*conveyor means for conveying said random mixed input letter and flat mail pieces from said reader means toward said plurality of receiving compartments;*

*computer control means, into which is input said printed address information read by said reader means from said random mixed input letter and flat mail pieces, and within which said sequenced delivery addresses as represented by said plurality of receiving compartments are also present, for controlling said sorting means in order to properly route said random mixed input letter and flat mail pieces toward said plurality of receiving compartments such that said letter and flat mail pieces are now properly arranged within said plurality of receiving compartments in accordance with said delivery address sequence;*

*a plurality of loading and transfer compartments, respectively operatively associated with said plurality of receiving compartments, for receiving said random mixed input letter and flat mail pieces from said conveyor means and for transferring said random mixed input letter and flat mail pieces to predetermined ones of said receiving compartments so as to properly arrange said letter and flat mail pieces within said plurality of receiving compartments in accordance with said delivery address sequence, wherein:*

*said sorting means comprises diverter gates provided within said conveyor means and activated by said computer control means for diverting predetermined ones of said random mixed input letter and flat mail pieces toward predetermined ones of said plurality of loading and transferring compartments;*

*said plurality of loading and transferring compartments are disposed within a first vertical array;*

*said plurality of receiving compartments are disposed in a second vertical array disposed adjacent to said first vertical array of said plurality of loading and transferring compartments;* said first vertical array of said loading and transferring compartments are mounted upon a first vertically oriented flexible drive chain conveyor; and said second vertical array of said receiving compartments are mounted upon a second vertically oriented flexible drive chain conveyor.

12. [The system as set forth in claim 7, wherein:] *A postal mail handling and sorting system, comprising:*

*input feed means for feeding a random mixed input of mail pieces having randomly arranged street addresses printed thereon, said random mixed input of said mail pieces comprises a random mixed input of letter and flat mail pieces;*

*a plurality of receiving compartments, respectively representing a plurality of delivery addresses arranged in a predetermined sequence which corresponds to sequenced delivery addresses upon a particular route to which mail is to be delivered in accordance with a delivery address sequence, for receiving said mail pieces in said delivery address sequence;*

*means for sorting said random mixed input of mail pieces such that said sorted mail pieces can be placed into said plurality of receiving compartments as a result of a single pass of said random mixed input of mail pieces through said system from said input feed means to said plurality of receiving compartments whereby mail pieces originally comprising said random mixed input of said mail pieces having said randomly arranged street addresses printed thereon are now disposed within said plurality of receiving compartments so as to be arranged in said delivery address sequence;*

*reader means for reading printed address information from said random mixed input letter and flat mail pieces;*

*conveyor means for conveying said random mixed input letter and flat mail pieces from said reader means toward said plurality of receiving compartments;*

*computer control means, into which is input said printed address information read by said reader means from said random mixed input letter and flat mail pieces, and within which said sequenced delivery addresses as represented by said plurality of receiving compartments are also present, for controlling said sorting means in order to properly route said random mixed input letter and flat mail pieces toward said plurality of receiving compartments such that said letter and flat mail pieces are now properly arranged within said plurality of receiving compartments in accordance with said delivery address sequence;*

*a plurality of loading and transfer compartments, respectively operatively associated with said plurality of receiving compartments, for receiving said random mixed input letter and flat mail pieces from said conveyor means and for transferring said random mixed input letter and flat mail pieces to predetermined ones of said receiving compartments so as to properly arrange said letter and flat mail pieces within said plurality of receiving compartments in accordance with said delivery address sequence, wherein:*

*said sorting means comprises diverter gates provided within said conveyor means and activated by said computer control means for diverting predetermined ones of said random mixed input letter and flat mail pieces toward predetermined ones of said plurality of loading and transferring compartments;*

*said plurality of loading and transferring compartments are disposed within a first vertical array;*

*said plurality of receiving compartments are disposed in a second vertical array disposed adjacent to said first vertical array of said plurality of loading and transferring compartments;* said first vertical array of said loading and transferring compartments are mounted upon a plurality of first vertically oriented flexible drive chain conveyors arranged within a horizontal array; and said second vertical array of said receiving compartments are mounted upon a plurality of second vertically oriented flexible drive chain conveyors arranged within said horizontal array.

14. [The system as set forth in claim 7, wherein:] *A postal mail handling and sorting system, comprising:*

*input feed means for feeding a random mixed input of mail pieces having randomly arranged street addresses printed thereon, said random mixed input of said mail pieces comprises a random mixed input of letter and flat mail pieces;*

*a plurality of receiving compartments, respectively representing a plurality of delivery addresses arranged in a predetermined sequence which corresponds to sequenced delivery addresses upon a particular route to which mail is to be delivered in accordance with a delivery address sequence, for receiving said mail pieces in said delivery address sequence;*

*means for sorting said random mixed input of mail pieces such that said sorted mail pieces can be placed into said plurality of receiving compartments as a result of a single pass of said random mixed input of mail pieces through said system from said input feed means to said plurality of receiving compartments whereby mail pieces originally comprising said random mixed input of said mail pieces having said randomly arranged street addresses printed thereon are now disposed within said plurality of receiving compartments so as to be arranged in said delivery address sequence;*

*reader means for reading printed address information from said random mixed input letter and flat mail pieces;*

*conveyor means for conveying said random mixed input letter and flat mail pieces from said reader means toward said plurality of receiving compartments;*

*computer control means, into which is input said printed address information read by said reader means from said random mixed input letter and flat mail pieces, and within which said sequenced delivery addresses as represented by said plurality of receiving compartments are also present, for controlling said sorting means in order to properly route said random mixed input letter and flat mail pieces toward said plurality of receiving compartments such that said letter and flat mail pieces are now properly arranged within said plurality of receiving compartments in accordance with said delivery address sequence;*

*a plurality of loading and transfer compartments, respectively operatively associated with said plurality of receiving compartments, for receiving said random mixed input letter and flat mail pieces from said conveyor means and for transferring said random mixed input letter and flat mail pieces to predetermined ones of said receiving compartments so as to properly arrange said letter and flat mail pieces within said plurality of receiving compartments in accordance with said delivery address sequence, wherein:*

*said sorting means comprises diverter gates provided within said conveyor means and activated by said com-*

*puter control means for diverting predetermined ones of said random mixed input letter and flat mail pieces toward predetermined ones of said plurality of loading and transferring compartments;*

*said plurality of loading and transferring compartments are disposed within a first vertical array;*

*said plurality of receiving compartments are disposed in a second vertical array disposed adjacent to said first vertical array of said plurality of loading and transferring compartments;* said plurality of receiving compartments disposed within said second vertical array comprises a pair of laterally adjacent receiving compartments disposed at each elevational level of said second vertical array; and said plurality of loading and transferring compartments disposed within said first vertical array each comprises a single compartment at each elevational level of said first vertical array which is movable between a central loading position at which each one of said loading and transferring compartments receives a piece of mail from said conveyor means, and a pair of laterally spaced unloading positions at which each one of said loading and transferring compartments can transfer a piece of mail to either one of said pair of laterally adjacent receiving compartments of said plurality of receiving compartments.

15. A letter and flat mail handling and sorting system, comprising:

input feed means for feeding a random mixed input of letter and flat mail pieces having randomly arranged street addresses printed thereon;

reader means for reading printed address information from said fed random mixed input of letter and flat mail pieces;

a plurality of receiving compartments, respectively representing a plurality of delivery addresses arranged in a predetermined sequence which corresponds to sequenced delivery addresses upon a particular route to which letter and flat mail is to be delivered in accordance with a delivery address sequence, for receiving said letter and flat mail pieces in said delivery address sequence;

conveyor means for conveying said random mixed input of letter and flat mail pieces from said reader means toward said plurality of receiving compartments;

a plurality of loading and transfer compartments, respectively operatively associated with said plurality of receiving compartments, for receiving said random mixed input letter and flat mail pieces from said conveyor means and for transferring said random mixed input letter and flat mail pieces to predetermined ones of said receiving compartments so as to properly arrange said letter and flat mail pieces within said plurality of receiving compartments in accordance with said delivery addrss sequence;

means operatively connected to said conveyor means for sorting said random mixed input of letter and flat mail pieces such that said sorted letter and flat mail pieces can be directed into said plurality of loading and transfer compartments, and in turn into said plurality of receiving compartments, as a result of a single pass of said random mixed input of letter and flat mail pieces through said system from said input feed means to said plurality of receiving compartments whereby letter and flat mail pieces originally comprising said random mixed input of said letter and flat mail pieces having said randomly arranged street addresses printed thereon are now disposed within said plurality of receiving compartments so as to be arranged in said delivery address sequence; and computer control means, into which is input said printed address information read by said reader means from said random mixed input letter and flat mail pieces, and within which said sequenced delivery addresses as [respresented] *represented* by said plurality of receiving compartments are also present, for controlling said sorting means and said plurality of loading and transfer compartments in order to properly route said random mixed input letter and flat mail pieces toward said plurality of receiving compartments such that said letter and flat mail pieces are now properly arranged within said plurality of receiving compartments in accordance with said delivery address sequence,

*wherein the plurality of receiving compartments and the plurality of loading and transfer compartments are moveable and disposed in a vertical orientation.*

16. [The system as set forth in claim 15,] *A letter and flat mail handling and sorting system, comprising:*

*input feed means for feeding a random mixed input of letter and flat mail pieces having randomly arranged street addresses printed thereon;*

*reader means for reading printed address information from said fed random mixed input of letter and flat mail pieces;*

*a plurality of receiving compartments, respectively representing a plurality of delivery addresses arranged in a predetermined sequence which corresponds to sequenced delivery addresses upon a particular route to which letter and flat mail is to be delivered in accordance with a delivery address sequence, for receiving said letter and flat mail pieces in said delivery address sequence;*

*conveyor means for conveying said random mixed input of letter and flat mail pieces from said reader means toward said plurality of receiving compartments;*

*a plurality of loading and transfer compartments, respectively operatively associated with said plurality of receiving compartments, for receiving said random mixed input letter and flat mail pieces from said conveyor means and for transferring said random mixed input letter and flat mail pieces to predetermined ones of said receiving compartments so as to properly arrange said letter and flat mail pieces within said plurality of receiving compartments in accordance with said delivery address sequence;*

*means operatively connected to said conveyor means for sorting said random mixed input of letter and flat mail pieces such that said sorted letter and flat mail pieces can be directed into said plurality of loading and transfer compartments, and in turn into said plurality of receiving compartments, as a result of a single pass of said random mixed input of letter and flat mail pieces through said system from said input feed means to said plurality of receiving compartments whereby letter and flat mail pieces originally comprising said random mixed input of said letter and flat mail pieces having said randomly arranged street addresses printed thereon are now disposed within said plurality of receiving compartments so as to be arranged in said delivery address sequence; and*

*computer control means, into which is input said printed address information read by said reader means from*

*said random mixed input letter and flat mail pieces, and within which said sequenced delivery addresses as represented by said plurality of receiving compartments are also present, for controlling said sorting means and said plurality of loading and transfer compartments in order to properly route said random mixed input letter and flat mail pieces toward said plurality of receiving compartments such that said letter and flat mail pieces are now properly arranged within said plurality of receiving compartments in accordance with said delivery address sequence,* wherein:

said plurality of loading and transferring compartments are disposed within a first vertical array; and said plurality of receiving compartments are disposed within a second vertical array disposed adjacent to said first vertical array of said plurality of loading and transferring compartments.

*24. The system as set forth in claim 15, wherein the means operatively connected to said conveyor means includes a single diverter gate for each sequencing module comprising the plurality of loading and transfer compartments.*

*25. A postal mail handling and sorting system, comprising:*

*input feed means for feeding a random mixed input of mail pieces having randomly arranged street addresses printed thereon;*

*a plurality of receiving compartments, respectively representing a plurality of delivery addresses arranged in a predetermined sequence which corresponds to sequenced delivery addresses upon a particular route to which mail is to be delivered in accordance with a delivery address sequence, for receiving said mail pieces in said delivery address sequence;*

*means for sorting said random mixed input of mail pieces to individual loading and transferring trays which are thereafter transferred therefrom into respective of said plurality of receiving compartments as a result of a single pass of said random mixed input of mail pieces through said system from said input feed means to said plurality of receiving compartments whereby mail pieces originally comprising said random mixed input of said mail pieces having said randomly arranged street addresses printed thereon are now disposed within said plurality of receiving compartments so as to be arranged in said delivery address sequence; and*

*a controller configured to vertically incrementally index the individual loading and transferring trays such that, upon actuation of a diverter gate configured to divert the random mixed input of mail pieces into the individual loading and transferring trays and depositing of a mail piece therein successive loading trays will be moved into a first or uppermost position so as to respectively receive the additional mail pieces deposited within each one of the loading trays.*

*26. A postal mail handling and sorting system, comprising:*

*input feed means for feeding a random mixed input of mail pieces having randomly arranged street addresses printed thereon;*

*a plurality of receiving compartments, respectively representing a plurality of delivery addresses arranged in a predetermined sequence which corresponds to sequenced delivery addresses upon a particular route to which mail is to be delivered in accordance with a delivery address sequence, for receiving said mail pieces in said delivery address sequence; and*

*means for sorting said random mixed input of mail pieces to individual loading and transferring trays which are thereafter transferred therefrom into respective of said plurality of receiving compartments which are laterally adjacent thereto as a result of a single pass of said random mixed input of mail pieces through said system from said input feed means to said plurality of receiving compartments whereby mail pieces originally comprising said random mixed input of said mail pieces having said randomly arranged street addresses printed thereon are now disposed within said plurality of receiving compartments so as to be arranged in said delivery address sequence,*

*wherein the individual loading and transferring trays extend outward to the plurality of laterally adjacent receiving compartments so as to dispose the mail piece therein.*

*27. A postal mail handling and sorting system, comprising:*

*input feed means for feeding a random mixed input of mail pieces having randomly arranged street addresses printed thereon;*

*a plurality of receiving compartments, respectively representing a plurality of delivery addresses arranged in a predetermined sequence which corresponds to sequenced delivery addresses upon a particular route to which mail is to be delivered in accordance with a delivery address sequence, for receiving said mail pieces in said delivery address sequence; and*

*means for sorting said random mixed input of mail pieces having a single diverter gate for each sequencing module comprising the plurality of receiving compartments which are laterally adjacent to respective transferring trays such that said sorted mail pieces can be placed into said plurality of receiving compartments from said adjacent respective transferring trays and as a result of a single pass of said random mixed input of mail pieces through said system including said single diverter gate from said input feed means to said plurality of receiving compartments from said adjacent respective transferring trays whereby mail pieces originally comprising said random mixed input of said mail pieces having said randomly arranged street addresses printed thereon are now disposed within said plurality of receiving compartments so as to be arranged in said delivery address sequence.*

*28. The postal mail handling and sorting system of claim 27, further comprising a single collection tub for collecting the mail pieces in the delivery address sequence output from the plurality of receiving compartments.*

*29. The postal mail handling and sorting system of claim 26, wherein the plurality of receiving compartments are vertically moveable spaced apart receiving compartments.*

*30. The postal mail handling and sorting system of claim 26, wherein the individual loading and transferring trays extend laterally outwardly on a base member and towards the plurality of receiving compartments.*

*31. The postal mail handling and sorting system of claim 26, wherein the individual loading and transferring trays are slidable upon a base member to move laterally towards the plurality of receiving compartments.*

*32. The postal mail handling and sorting system of claim 31, wherein the base member is attached to a conveyor which is routed around at least one drive pulley.*

*33. The postal mail handling and sorting system of claim 31, wherein the individual loading and transferring trays include a door pivotally moveable between a vertically upstanding position and a horizontally lowered position.*

*34. The postal mail handling and sorting system of claim 26, wherein the individual loading and transferring trays extend left and right with respect to a base member.*

*35. The postal mail handling and sorting system of claim 27, wherein the plurality of receiving compartments are vertically moveable spaced apart receiving compartments.*

*36. The postal mail handling and sorting system of claim 27, wherein the plurality of transferring trays extend outwardly away from a base member to the plurality of receiving compartments.*

*37. The postal mail handling and sorting system of claim 27, wherein the plurality of transferring trays are laterally slidable upon a base member.*

*38. The postal mail handling and sorting system of claim 37, wherein the base member is attached to a conveyor which is routed around pulleys.*

*39. The postal mail handling and sorting system of claim 27, wherein the plurality of transferring trays extend laterally outward to the plurality of adjacent receiving compartments.*

*40. The postal mail handling and sorting system of claim 27, wherein the plurality of transferring trays include a door pivotally moveable between a vertically upstanding position and a horizontally lowered position.*

*41. The postal mail handling and sorting system of claim 26, wherein the single pass is a single pass sorting.*

*42. The postal mail handling and sorting system of claim 27, wherein the single pass is a single pass sorting.*

* * * * *